A. C. FISHER.
FOLDING CAMERA.
APPLICATION FILED MAY 9, 1918.
1,276,743.
Patented Aug. 27, 1918.
2 SHEETS—SHEET 1.
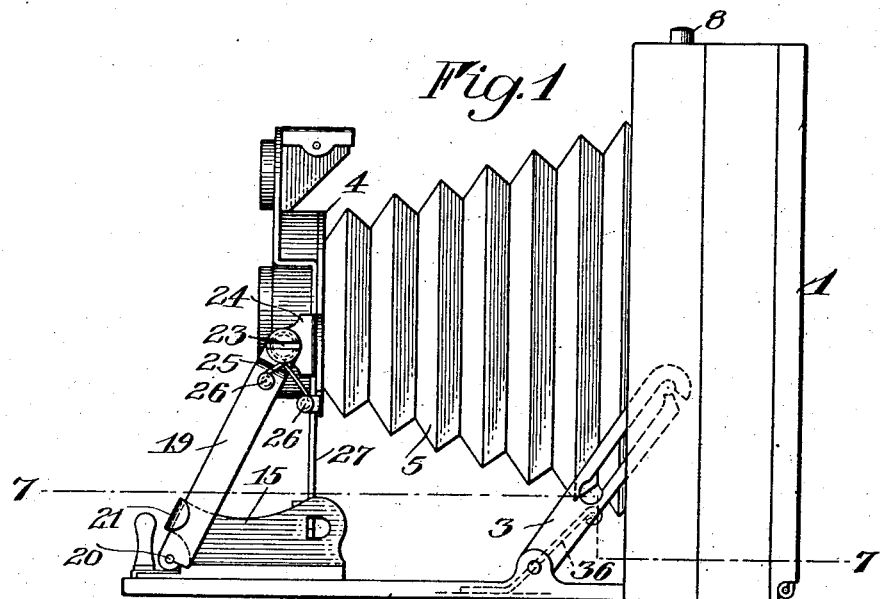
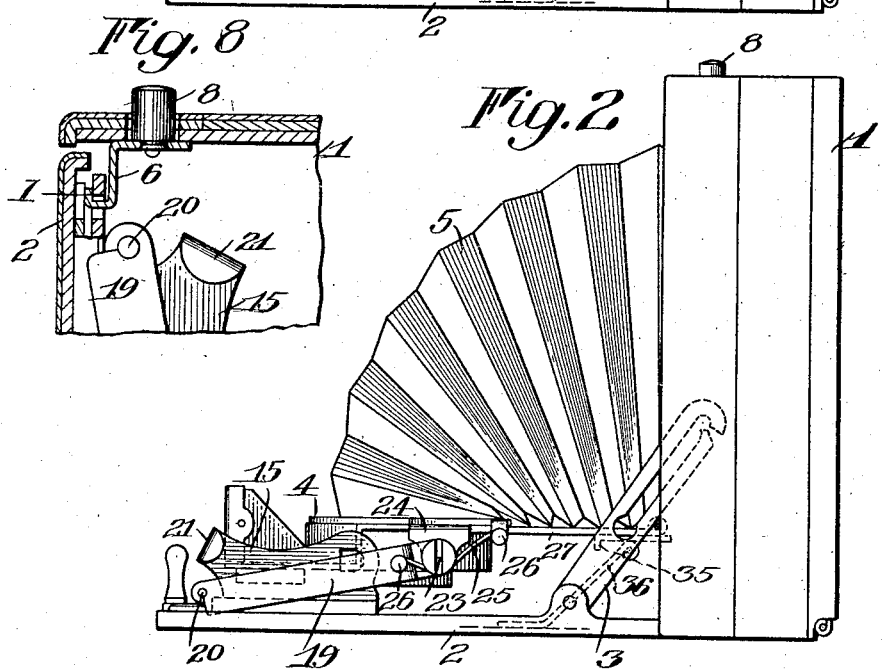
Witnesses:
Nelson H. Copp
INVENTOR
Austin Carl Fisher
BY
his ATTORNEYS A. C. FISHER.
FOLDING CAMERA.
APPLICATION FILED MAY 9, 1918.
1,276,743.
Patented Aug. 27, 1918.
2 SHEETS—SHEET 2.
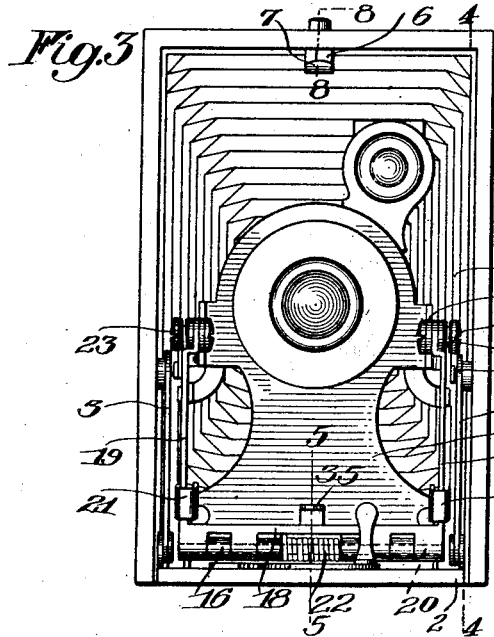
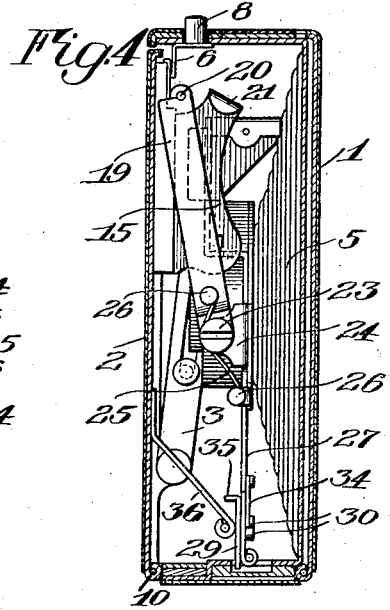
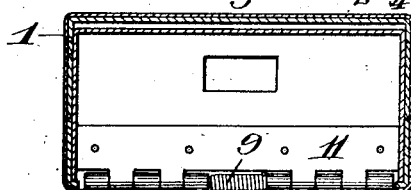
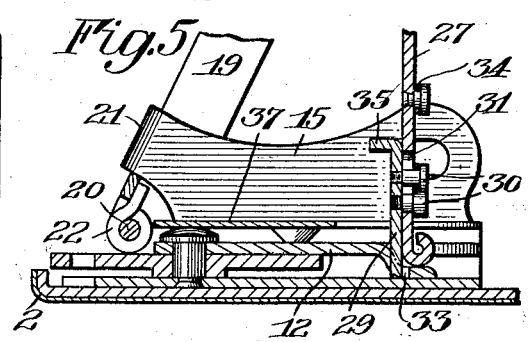
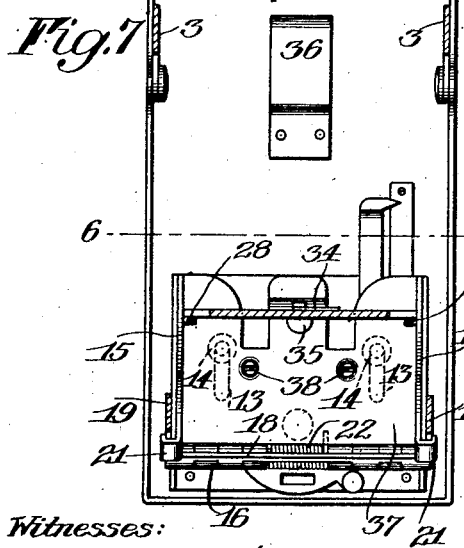
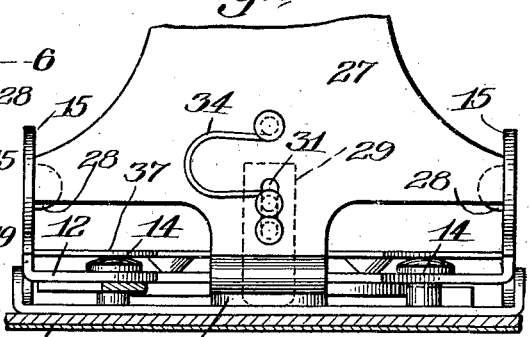
Witnesses:
Nelson H. Copp
[signature]
INVENTOR
Austin Carl Fisher
BY
[signature]
his ATTORNEYS

UNITED STATES PATENT OFFICE.

AUSTIN CARL FISHER, OF ROCHESTER, NEW YORK, ASSIGNOR TO EASTMAN KODAK COMPANY, OF ROCHESTER, NEW YORK, A CORPORATION OF NEW YORK.

FOLDING CAMERA.

1,276,743.  Specification of Letters Patent.  Patented Aug. 27, 1918.

Original application filed March 12, 1917, Serial No. 154,179. Divided and this application filed May 9, 1918. Serial No. 233,444.

*To all whom it may concern:*

Be it known that I, AUSTIN CARL FISHER, of Rochester, in the county of Monroe and State of New York, have invented certain new and useful Improvements in Folding Cameras; and I do hereby declare the following to be a full, clear, and exact description of the same, reference being had to the accompanying drawings, forming a part of this specification, and to the reference-numerals marked thereon.

My present invention relates to photography and has for its object to provide a camera of the folding type in which is employed a simple, strong and serviceable arrangement for automatically projecting the front and lens to approximately its operative position when the camera is unfolded. The improvements are further directed toward increasing the rigidity of the front when so projected and to these and other ends the invention resides in certain improvements and combinations of parts all as will be hereinafter more fully described, the novel features being pointed out in the claims at the end of the specification.

In the drawings:

Figure 1 is a side elevation of a folding camera constructed in accordance with and illustrating one embodiment of my invention, the same being shown extended or in operative position;

Fig. 2 is a similar view illustrative of the manner in which the camera is folded;

Fig. 3 is a front view;

Fig. 4 is a section through the camera when folded taken near the plane of the inner face of one of its side walls substantially on the line 4—4 of Fig. 3;

Fig. 5 is an enlarged detail fragmentary view in section on the line 5—5 of Fig. 3;

Fig. 6 is an enlarged detail fragmentary view of the rear of the carriage and front taken in section transversely of the bed, substantially on the line 6—6 of Fig. 7;

Fig. 7 is a horizontal section with the bellows removed, taken substantially on the line 7—7 of Fig. 1 and showing in plan the bed and lens carriage, and Fig. 8 is an enlarged detail fragmentary view in section on the line 8—8 of Fig. 3.

Similar reference numerals throughout the several views indicate the same parts.

This application is a division of my prior application Serial No. 154,179, filed March 12, 1917, in which I describe and claim a focusing device or mechanism for adjusting the lens 7, which mechanism is particularly applicable to the device hereinafter described.

In the present embodiment, the camera comprises a body 1 and a hinged bed 2 of the usual type that is supported when extended by links 3 and when closed, acts as a door or closure for the front of the body in which latter the front 4 and bellows 5 may be housed as shown in Fig. 4. A spring catch 6 having an upwardly turning locking lip 7 released by a button 8 projecting to the exterior of the body 1 holds the bed in folded position in a manner to be hereinafter described and when the catch is released, the bed is thrown to its extended or operative position and supported and locked there by the links 3 through the influence of a spring 9 surrounding the pintle 10 of the hinge that connects the bed and body at 11.

In the practice of my invention, I provide at the forward end of the bed a carriage plate 12 (Fig. 7) that has a limited movement longitudinally thereof to project, if desired, beyond its forward end, which carriage plate has slots 13 by means of which it is guided on headed pins 14 fixed in the bed. The sides of the carriage plate are turned upwardly into parallel flanges 15 while the front edge is formed into a hinge knuckle 16 coöperating with the knuckle 17 on a cross piece 18 connecting the arms or links 19 of an integral yoke that is thus pivoted on the pintle 20 to the forward end of the carriage. The links 19 work on the outer sides of the flanges 15 and at the forward ends of the latter are outwardly or laterally turned abutment ears 21. These act as stops defining the extended positions of the links when brought forward under the influence of a spring 22 that surrounds the pintle 20.

The upper ends of the links 19 are pivoted at 23 to forwardly turned ears 24 on the sides of the front or lens board 4 and surrounding the pivots 23 are springs 25 bearing against studs 26 on the links and lens board, respectively, and tending to rotate the lens board so that its base will be urged forwardly. During such movement, the said base indicated at 27, passes between the flanges 15 until it abuts inwardly turned ears 28 thereon arranged near the rear ends of the flanges. When this engagement takes place, a vertically sliding catch or bolt 29 guided by means of pins 30 operating in a slot 31 in the front base 27 locks the latter to a rearward extension 32 of the carriage plate 12 by engaging in an aperture 33 in a depressed portion of said extension under the influence of a spring 34 (Fig. 6).

In the folded position of Fig. 4, the links 19 are folded rearwardly to a position against or substantially parallel with the bed 2 while the front 4 has been rotated forwardly on its pivotal connections 23 with the links to also lie parallel with and against the bed. As the button 8 is pressed and the bed 2 released, it swings forwardly to its open position immediately. At the same time, the links 19 swing forwardly under the influence of their spring 22 until stopped by the abutments 21 in the rearwardly inclined positions shown in Fig. 1 which raises the front 4. As soon as the latter is carried up sufficiently far, it begins to rotate upon the pivots 23 under the influence of its own springs 25 until its base 27 comes up against the abutments 28 and it is locked by the bolt 29. The front is then in an erect operative position on the carriage and it will be noted that inasmuch as it rests upon the rear end of the latter while the links 19 provide inclined braces at the front, a substantially triangular support for the lens of great rigidity is provided. To fold the camera, the bolt 29 is released by means of an operating portion 35 and the front 4 is grasped at the top and rotated forwardly and downwardly carrying the links 19 with it, as shown in Fig. 2. During this movement, the base 27 of the front, in swinging rearwardly on two centers, engages a rearwardly inclined tongue 36 on the bed 2 and is guided thereby to its proper folded parallel relationship with the bed in which position the tongue also supports it while the parts are folded, as clearly shown in Fig. 4. The bed is then closed against the body from the position of Fig. 2, as usual, whereat the parts remain confined in their folded positions as in Fig. 4.

The carriage plate 12 is, in the present instance, fitted with an overlying cover plate 37 held against it by two screws 38 but this is provided merely to give a finished appearance and conceal the working parts of the carriage plate.

I claim as my invention:

1. In a folding camera, the combination with a body and a hinged bed closing the front thereof, of a carriage mounted on the bed having two sets of abutments, a pair of links pivoted to the carriage to swing forwardly against one set of abutments or to fold rearwardly against the bed, a front pivoted to the links to also fold against the bed and adapted to engage the other set of abutments on the carriage, a bellows connecting the front and body and means for projecting the front and links from folded position.

2. In a folding camera, the combination with a body and a hinged bed closing the front thereof, of a carriage plate mounted on the bed having upwardly extending side flanges provided with outwardly turned forward abutments and inwardly turned rearward abutments, a pair of links pivoted to the carriage plate on the outer sides of the flanges to swing forwardly against the said forward abutments or to fold rearwardly against the bed, a front pivoted to the links to also fold against the bed and adapted to swing forwardly between the flanges of the carriage plate and engage the rearward abutments thereon, a bellows connecting the front and body and means for projecting the front and links from folded position.

3. In a folding camera, the combination with a body and a hinged bed closing the front thereof, of a pair of links pivoted to the bed to fold rearwardly against the latter, a front pivoted to the links to fold forwardly against the bed, an inclined tongue on the bed for guiding the front to its folded position by engagement with the base thereof, a bellows connecting the front and body and means for projecting the front and links from folded position.

AUSTIN CARL FISHER.

Copies of this patent may be obtained for five cents each, by addressing the "Commissioner of Patents, Washington, D. C."